(12) United States Patent
Saastamoinen

(10) Patent No.: US 10,585,836 B2
(45) Date of Patent: Mar. 10, 2020

(54) APPARATUS, A DEVICE, AND A METHOD FOR ADDRESSING A DEVICE BY THE APPARATUS

(71) Applicant: Valmet Automation Oy, Espoo (FI)

(72) Inventor: Vesa Saastamoinen, Nokia (FI)

(73) Assignee: Valmet Automation Oy, Espoo (FI)

( * ) Notice: Subject to any disclaimer, the term of this patent is extended or adjusted under 35 U.S.C. 154(b) by 0 days.

(21) Appl. No.: 15/953,866

(22) Filed: Apr. 16, 2018

(65) Prior Publication Data

US 2018/0300281 A1 Oct. 18, 2018

(30) Foreign Application Priority Data

Apr. 18, 2017 (FI) ...................................... 20175352

(51) Int. Cl.
| | |
|---|---|
| *G06F 12/00* | (2006.01) |
| *G06F 12/02* | (2006.01) |
| *G06F 12/06* | (2006.01) |
| *G06F 13/42* | (2006.01) |

(Continued)

(52) U.S. Cl.
CPC ............ *G06F 13/42* (2013.01); *G06F 13/122* (2013.01); *G06F 13/4022* (2013.01); *G06F 13/4068* (2013.01)

(58) Field of Classification Search
CPC ........... G06F 12/00; G06F 12/02; G06F 12/06
See application file for complete search history.

(56) References Cited

U.S. PATENT DOCUMENTS

| | | |
|---|---|---|
| 6,438,625 B1 | 8/2002 | Olson |
| 6,564,278 B1 | 5/2003 | Olson |
| 6,577,250 B1 | 6/2003 | Yee |

(Continued)

FOREIGN PATENT DOCUMENTS

JP 2009118155 A 5/2009

OTHER PUBLICATIONS

English Translation of JP-2009-118155—all pages (Year: 2009).*

(Continued)

*Primary Examiner* — David E Martinez
(74) *Attorney, Agent, or Firm* — Berggren LLP (57) ABSTRACT

The invention relates to an apparatus, a device and a method. The apparatus is configured for providing an address to a device attachable with the apparatus. The apparatus comprises at least one connector capable of receiving the device, an address composer for producing an address signal, and an address line in the connector for providing the address signal to the device, the address signal being indicative of an address to be used by the device when attached with the apparatus. The address composer is configured to generate the address signal as an analogue address signal. The device comprises at least one connector capable of receiving the device, an address composer for producing an address signal, an address line in the connector for providing the address signal to the device, the address signal being indicative of an address to be used by the device when attached with the apparatus, an input for receiving the address signal as an analogue address signal, a comparator for comparing the level of the analogue address signal with a set of reference values; and a determinator to determine the address to be used by the device on the basis of the comparison result.

4 Claims, 5 Drawing Sheets

(51) Int. Cl.
    *G06F 13/40*     (2006.01)
    *G06F 13/12*     (2006.01)

(56) References Cited

U.S. PATENT DOCUMENTS

| | | |
|---|---|---|
| 2005/0125575 A1 | 6/2005 | Alappat |
| 2005/0259642 A1 | 11/2005 | Yang |
| 2006/0075179 A1* | 4/2006 | Ripy .................. H04L 12/2854 710/309 |
| 2009/0327540 A1 | 12/2009 | Robertson |
| 2011/0185093 A1 | 7/2011 | Matsuo |
| 2012/0020401 A1 | 1/2012 | Itou |

OTHER PUBLICATIONS

Search and examination report of the priority application FI20175352 issued by Finnish Patent and Registration office dated Nov. 15, 2017.

Search report of the EP application 18397513.5 issued by European Patent office dated Sep. 17, 2018.

* cited by examiner

APPARATUS, A DEVICE, AND A METHOD FOR ADDRESSING A DEVICE BY THE APPARATUS

PRIORITY

This application claims priority of Finnish application FI 20175352 filed on 18 Apr. 2017 the content of which is incorporated herein by reference.

TECHNICAL FIELD

The present invention relates to an apparatus for providing an address to a device attachable with the apparatus, a device capable of being connected with an apparatus, and a method for determining an address defined for a device attached with an apparatus.

BACKGROUND

In an automation system measurement data, control signals for actuators, etc. may be handled by several modules designed for such purposes. Modules are often coupled to the automation system via a bus which may transfer signals between the modules and other parts of the automation systems. The bus may also be called as an I/O bus (input/output). Because several modules are coupled to the same bus there is a need to provide some kind of addressing method so that messages can be delivered to correct recipients via the I/O bus. An addressing solution is to provide so called DIP switches or corresponding switchable elements in the modules wherein each module may be set with an individual address by setting the switches accordingly. However, each address bit of the address needs one switch and also one address line in the I/O bus. Hence, to be able to distinguish (address) e.g. 16 different modules one needs to have four address lines in the bus and four switches in each module. The switches occupy some space from the modules and may prevent size reduction of the modules. Moreover, a user may erroneously turn the DIP switches into incorrect positions, wherein the address indicated by the DIP switches is not correct.

SUMMARY

An aim of the present invention is to provide an alternative way of addressing apparatuses so that less lines are needed in the bus and no switches are needed in the apparatuses for addressing purposes. In accordance with an embodiment, the addressing is based on analogue voltages or other analogue signals so that each module may recognise its identity in the bus by a certain voltage/signal level.

According to a first aspect there is provided an apparatus for providing an address to a device attachable with the apparatus, the apparatus comprising:
at least a first interface connector and a second interface connector;
a first address composer for said first interface connector configured to produce an address signal as an analogue address voltage or an analogue address current from an analogue input voltage or current;
a second address composer for said second interface connector configured to produce an address signal as an analogue address voltage or an analogue address current from an analogue input voltage or current;
an address line in each of the at least two connectors configured to provide the address signal to the device, the address signal being indicative of an address to be used by the device when attached with the apparatus;
an address signal input in each of said first interface connector and said second interface connector for receiving an analogue input voltage or current for the address composer; and
an address signal output in each of said first interface connector and said second interface connector for outputting the address signal generated by the address composer from the analogue input signal,
wherein the address signal output of said first interface connector is coupled with the address signal input of said second interface connector for receiving the address signal generated by the first address composer.

According to a second aspect there is provided a device capable of being connected with an apparatus according to any of the claims 1 to 5, wherein the device comprises:
an input for receiving the address signal as an analogue address voltage or an analogue address current;
an analogue to digital converter configured to convert the analogue address signal to a digital value;
a comparator for comparing the digital value of the analogue address signal with a set of reference values to find out an address-signal level pair corresponding with the digital value of the analogue address signal; and
a determinator to determine the address to be used by the device on the basis of the comparison result.

According to a third aspect there is provided a method for determining an address defined for a device attached with an apparatus, the method comprising:
inputting an analogue address signal to the device as an analogue address voltage or an analogue address current;
comparing the digital value of the analogue address signal with a set of reference signals to find out a reference signal which corresponds with the analogue address signal;
if a reference signal corresponding with the analogue address signal is found, using information related to the reference signal to determine the address.

The analogue addressing scheme may produce several advantages. For example, less input/output pins may be needed to read the address, wherein less pins may be needed in connectors or a larger amount of pins of the connectors may be used for other purposes compared to the situations in which more than one pin is used for providing address information to devices coupled with the connectors. Moreover, in accordance with an embodiment, a voltage/current drop can be made with passive components so there may be no need to use active components in the backplane. This may improve reliability of the system.

BRIEF DESCRIPTION OF THE DRAWINGS

In the following some embodiments will be described in more detail with reference to the appended drawings, in which.

DETAILED DESCRIPTION

Figure 1:
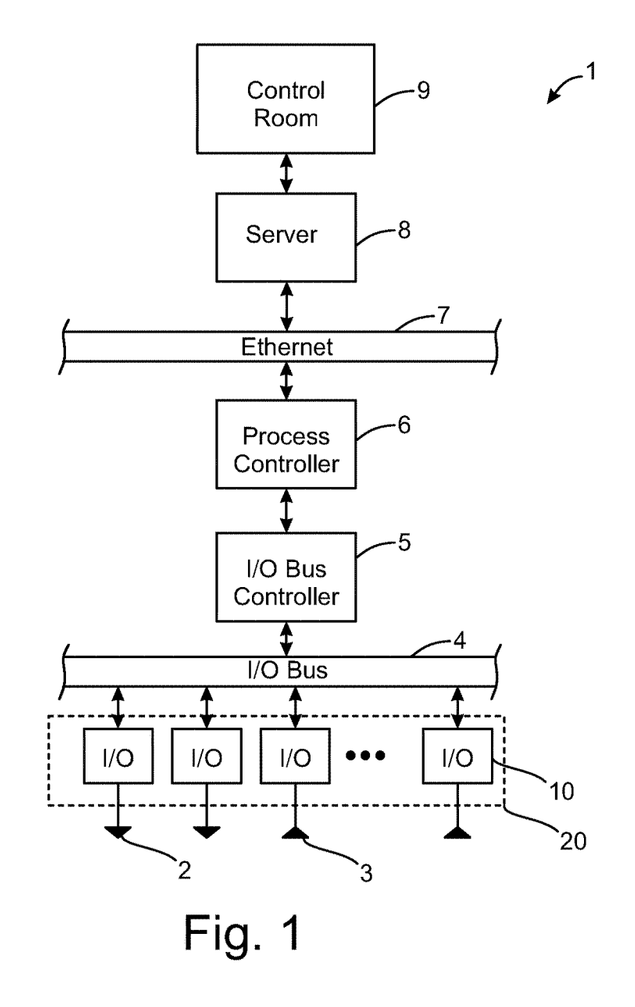
FIG. 1 illustrates a part of an automation system, in accordance with an embodiment.

FIG. 1 depicts a part of an automation system 1, in accordance with an embodiment. In this example the automation system 1 is a so-called distributed control system (DCS) that may comprise several process stations, input/output (I/O) devices and other servers, buses and stations; however, only one process station and the components connected to it are shown for the sake of clarity. The input/output devices may also be called as input/output modules or interface devices or interface modules.

In the automation system 1 of FIG. 1, at least one sensor 3 is coupled to different components or devices in the process to collect signals indicating the condition of the process, that is, measurement data required for controlling the process. The signals measured by the sensors 3 are led into at least one I/O unit 10. The I/O unit 10 may comprise at least one electronics card and the other components required for forming the I/O (inputs and outputs). The sensors 3 may measure, for example, the pressure or the temperature prevailing in the process or process components, the rotational speed of moving parts, the properties of a product to be manufactured, or the flow rate or level of suspensions flowing in the process, etc.

In accordance with an embodiment, the I/O unit 10 may receive measurement signals and, among other things, convert the analogue signals to digital format, unless the sensor outputs signals in digital form. Alternatively or in addition to, the I/O unit 10 may output control signals to actuators 2 such as valves, motors, switches of the process. The control signals may be based on control information received from the process station 6 and which may also be initiated e.g. by process control operations of the control room 9. From the I/O unit 10, the measurement signals are transmitted via an I/O bus 4 to an I/O bus controller 5 which may forward the measurement signals to a process station 6. The process station 6 comprises at least a part of a process station software, by means of which various indices and functions are computed from the measurement signals. The computation and generation of the controls may also take place in the process station 6. From the process station 6, the digital signals and/or the computed indices or functions are transmitted in the form of data to be stored in a database server 8. The real-time data obtained from the process station and the history data obtained from the database can be viewed in a user interface 9.

The process station 6 is coupled to a communication bus 7, for example an Ethernet network. If there are more than one process station 6 in the system, they can all be connected to the same communication bus 7. The user interface in a control room 9 may communicate with the database server 8, which also communicates with the process station. The communication buses can also be formed by coupling the process station 6, the database server 8, as well as the user interface 9 to one and the same communication bus.

The user interface 9 may comprise at least one display device and one or more input devices. The display device may be a display based on a cathode tube, a flat panel display, an image projected onto a substrate, or a personal, portable display device. The input device may be a conventional keyboard, a mouse, or another data input device.

Figure 3A:
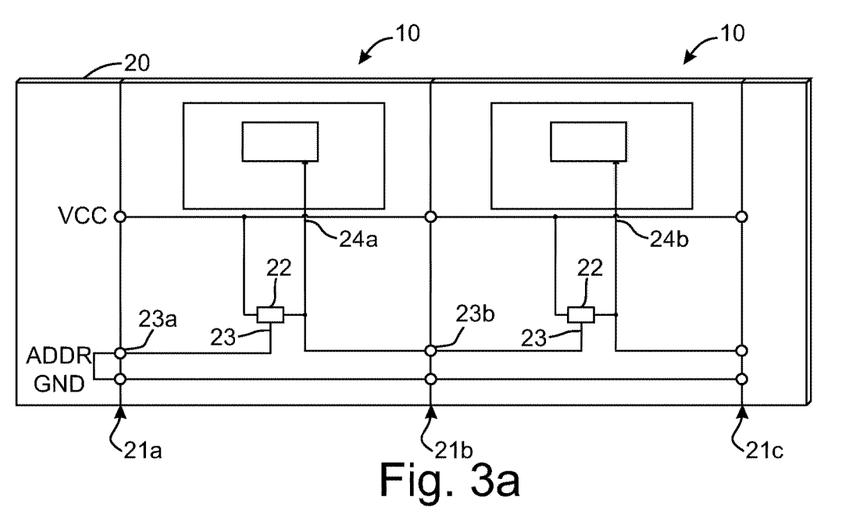
FIG. 3a illustrates as a simplified block diagram a method for producing addresses in a backplane, in accordance with an embodiment.
Figure 3B:
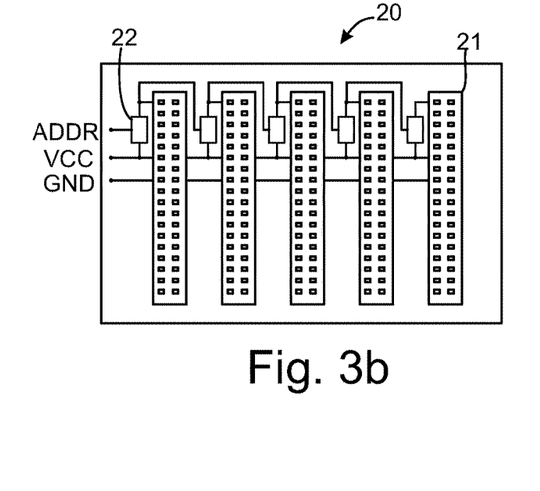
FIG. 3b depicts a backplane for a plurality of modules, in accordance with an embodiment.
Figure 3C:
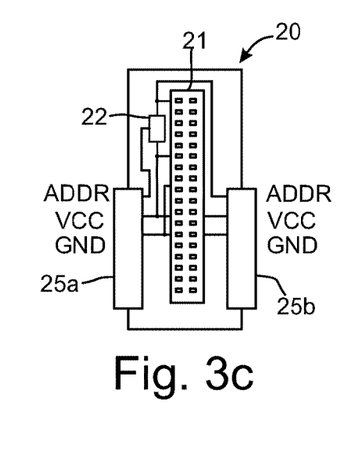
FIG. 3c depicts a backplane for a single module, in accordance with an embodiment.

FIG. 3a illustrates an addressing principle, in accordance with an embodiment, FIG. 3b a simplified example of a mechanical structure of a backplane 20 for a plurality of modules, in accordance with an embodiment, and FIG. 3c a simplified example of a mechanical structure of a backplane 20 for a single module, in accordance with an embodiment.

In this example of FIG. 3b the backplane 20 has a set of connectors 21 for several input/output modules 10. These connectors 21 may also be called as slots in this specification. The backplane 20 has also several electrically conducting wires (only some of which shown) to provide supply voltage VCC, a ground plane GND, an analogue addressing signal ADDR, data signals etc. to/from the input/output modules 10 via the connectors 21. In the example of FIG. 3a only two input/output modules 10 coupled with the backplane 20 are shown but in practical implementations the number of connectors 21 as well as the number of input/output modules 10 may be different from two, for example four, eight or sixteen.

To be able to distinguish input/output modules 10 and the connectors they have been coupled with, an addressing scheme is needed. For example, the first connector of the backplane may be considered to have an address 0, the second connector of the backplane may be considered to have an address 1, etc. The last connector of the backplane may be considered to have an address N−1, in which N is the number of connectors in the backplane 20. In other words, the address may also indicate the physical place or an order number of a connector of the backplane and an order number of a module connected to the connector.

It should be noted here that the above mentioned backplane 20 may not be used but, for example, each connector has its own base plate 20, wherein a larger input/output station may be formed by using a plurality of base plates and coupling base plates in series with connecting cables. An example of this is depicted in FIG. 3c. However, this embodiment also uses some kind of analogue signal based addressing scheme, which may be similar to the above described addressing scheme. The base plate 20, which may also be called as a backplane, is provided with a first interface connector 25a and a second interface connector 25b by which several base plates can be connected in series. The first interface connector 25a and the second interface connector 25b may form a kind of socket-plug pair, wherein the second interface connector 25b of a first base plate may be coupled with the first interface connector 25a of a second base plate, the second interface connector 25b of the second base plate may be coupled with a first interface connector 25a of a third base plate etc. Alternatively, cables may be used between two subsequent base plates to provide the series connection of several base plates.

Figures 4A, 4B:
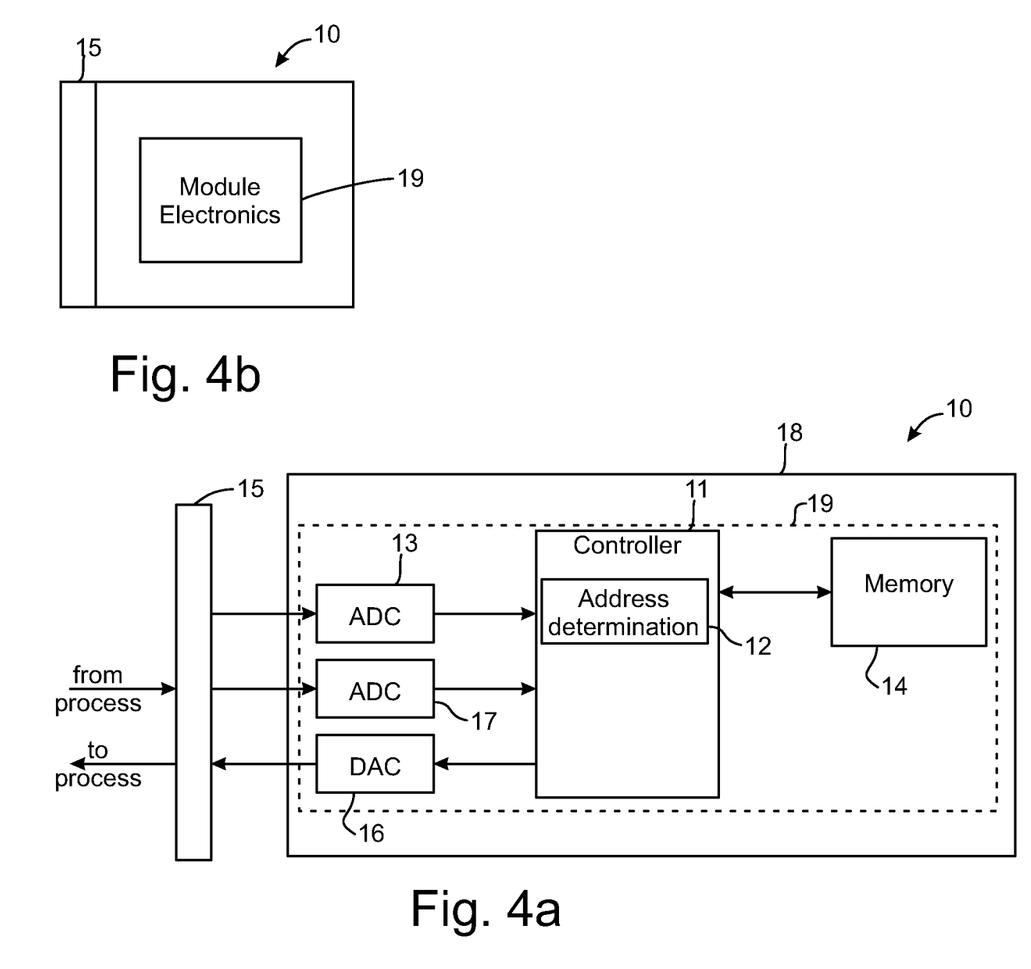
FIG. 4a depicts an input/output module, in accordance with an embodiment.
FIG. 4b illustrates as a simplified block diagram some parts of an input/output module, in accordance with an embodiment.

FIG. 4a depicts as a simplified block diagram at least a part of the electric and electronic structure of the input/output module 10, in accordance with an embodiment. The input/output module 10 comprises a controller 11 to control the operation of the input/output module 10, an address determination logic 12, and a memory 14. The input/output module 10 may also comprise some other elements such as a connector 15 to connect the input/output module 10 to a connector 21 of a backplane 20. It should be noted that in practical implementations the input/output module 10 may also comprise some other elements, which are not depicted in FIG. 4b. Mainly only those elements have been depicted which may take part of the address determination processing. The address determination logic 12 may be a part of the software of a controller 11 or maybe implemented with electronic circuitry or may be a combination of both of these. FIG. 4a depicts the address determination logic 12 as a part of the software of the controller 11. The input/output module 10 may comprise one or more analogue-to-digital converters 13 which converts the analogue address voltage into a digital value. This digital value, which may be called as a digital address, may then be examined by a controller 11 of the input/output module 10.

FIG. 4b is a top view of the input/output module 10, in accordance with an embodiment. In FIG. 4a only the connector 15, a printed circuit board 18 and the module electronics 19 (i.e. the controller 11, the address determination logic 12, the memory 14, and possible other electrical circuitry of the input/output module) are shown in a simplified manner.

Figure 2:
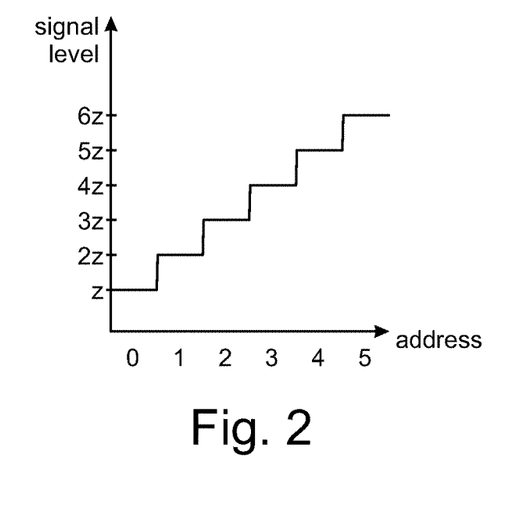
FIG. 2 illustrates an addressing principle, in accordance with an embodiment.

In the following, the analogue signal based addressing scheme will be described in more detail with reference to the diagram of FIG. 2 and the block diagram of FIG. 3a, in accordance with an embodiment.

In this example embodiment the addressing scheme is based on voltage levels but in some other embodiments the addressing scheme may be based on, for example, current levels, or LC-circuits. The backplane 20 comprises an analogue address composer 22, such as a voltage regulator for each connector 21. The voltage regulator 22 is, for example, a low dropout regulator (VLDO) but also other kinds of regulators may be used which are able to produce an output voltage which is proportional to a reference voltage. The low dropout regulator is capable to produce a regulated voltage at an output of the low dropout regulator so that the maximum obtainable output voltage is only little less than the supply voltage for the low dropout regulator (e.g. about 2 V below the supply voltage). The level of the output voltage can be controlled by a reference voltage at a reference voltage input 23 of the voltage regulator 22. Actually, the reference voltage input 23 may be a ground connector of the voltage regulator 22. At a first connector 21a of the backplane the reference voltage input 23a is coupled to a ground level i.e. 0 V. It is assumed here that the output voltage is z volts above the reference voltage. Hence, the output voltage from the first voltage regulator is 0 V+z V. This output voltage is coupled to a reference voltage input 23b of the second connector 21b of the backplane. Hence, the output voltage at the second connector is about z V+z V i.e. 2z V. The same principle applies to the other connectors of the backplane 20 as well, wherein the output voltage at the N-th connector can be expressed as Nz V. In other words, the output voltage to be used as an address signal is step-wise increased at each connector. In this example the step size is substantially constant (=z) but it need not be constant. For example, the step size may follow another function such as log (N) or $N^2$.

Figure 5:
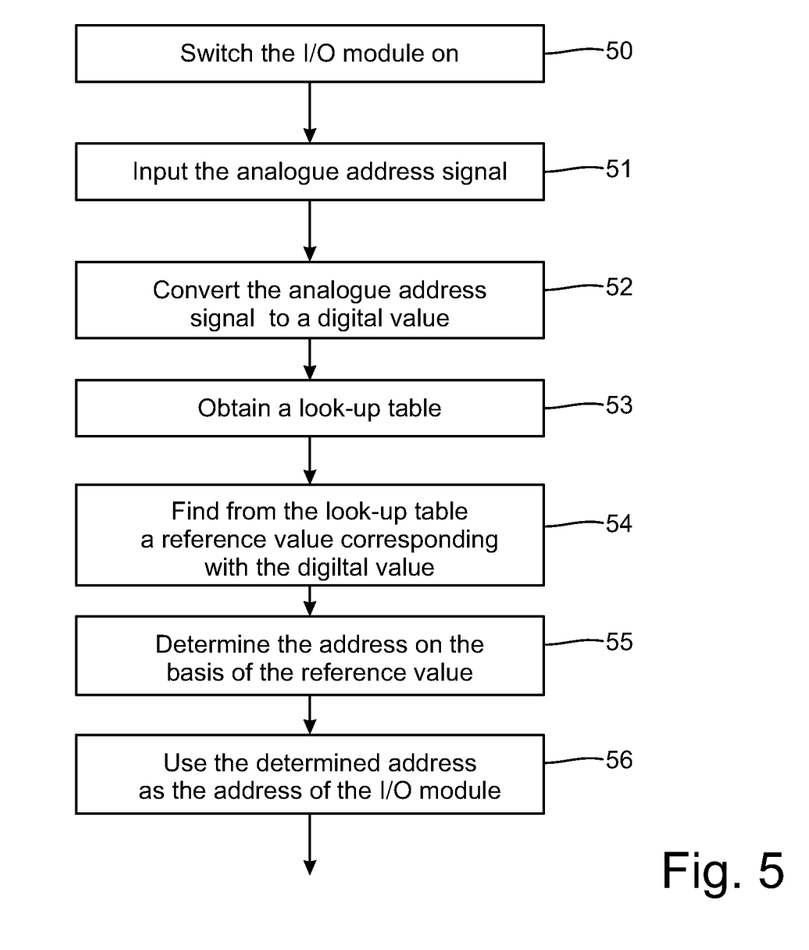
FIG. 5 is a flow diagram of a method, in accordance with an embodiment.

When the input/output module 10 is coupled to a connector 21 of the backplane, the input/output module 10 may be powered up and start operating (block 50 in FIG. 5). The analogue address signal is input (block 51) to the input/output module 10 via a pin 24a, 24b of the connector 21 of the backplane and a corresponding pin of the connector 15 of the input/output module 10. In the input/output module 10 the analogue address signal is provided to the analogue-to-digital converter 13, which converts (block 52) the analogue address signal into a digital value. The controller 11 may obtain (block 53) e.g. from the memory 14 of the input/output module 10 a look-up table or another means for comparing the digital value with reference values stored into the look-up table, or the controller 11 may use a function to reveal the address of the connector 21 of the backplane to which the input/output module 10 has been coupled. If the look-up table is used, the controller 11 may compare (block 54) the digital value with different values of the table and when it founds a value from the table which is substantially the same than the digital value (block 55), the controller 11 may use (block 56) an index of that value in the table to determine the actual address. One non-limiting example of such table is illustrated in Table 1a below and another non-limiting example of such table is illustrated in Table 1b below. The index-value pairs may also be called as address-signal level pairs.

TABLE 1a some examples of address values and corresponding indices

| Index | Value |
| --- | --- |
| 0 | 0.75 |
| 1 | 1.50 |
| 2 | 2.25 |
| 3 | 3.00 |

TABLE 1b some other examples of address values and corresponding indices

| Index | Value |
| --- | --- |
| 0 | 1.215 |
| 1 | 2.300 |
| 2 | 3.515 |
| ... | ... |
| 12 | 15.795 |

In practical implementations the maximum obtainable voltage value for the address signal depends inter alia on the supply voltage used for the voltage regulators 22. In an embodiment the maximum voltage value is about 2 V below the supply voltage to reserve some margin for regulation of the output voltage of the voltage regulators 22. However, a smaller or larger margin may be applied in some other embodiments. As an example, to be able to provide all the addresses of Table 1a the supply voltage may need to be 5 V or higher, and, correspondingly, to be able to provide all the addresses of Table 1b the supply voltage may need to be 18 V or higher, assuming that the margin is 2 V.

If the controller 11 uses a function to determine the address, the function may be similar to an inverse function of the function mentioned above, i.e. N=analog voltage/z−1, assuming that the lowest address (index) is 0.

Using the example values of Table 1a it can be deduced that the step size z=0.75. Hence, if, for example, the analogue voltage is about 1.5 V, it can be deduced that the address is N=1.

The input/output module 10 may also comprise another analogue-to-digital converter(s) 17 for receiving analogue measurement signals from the process and converting the measurement signals to digital samples. In addition to or instead of, the input/output module 10 may further comprise one or more digital-to-analogue converters 16 for converting digital control signals to analogue control signals to be used by actuator(s) of the process.

At the input/output module 10 the operation may be as follows. When the input/output module 10 is coupled to one connector of the backplane 20, the input/output module 10 is coupled to supply power line and ground, wherein the input/output module 10 is provided electricity and begins to operate. The controller 11 of the input/output module 10 starts to run software stored into a memory of the input/output module 10 which may also comprise a possible internal memory of the controller 11. At some stage during the execution of the software there may be instructions (computer code) for the controller to determine the address of the backplane 20 where the input/output module 10 has been coupled with. In accordance with an embodiment this may include the following. The analogue-to-digital converter 13 of the input/output module 10 is coupled to the address line ADDR in the connector 21 of the backplane 20, wherein the analogue-to-digital converter 13 converts the voltage at the address line to one or more digital values representing the voltage at the address line. The controller 11 reads the digital value and performs the examination of the digital value as was described above. When the controller 11 has determined the address, it may be stored into the memory and used later on as the address of the input/output module 10. In other words, in this embodiment the address needs to be determined only once after the input/output module 10 has started to operate. On the other hand, if the voltage supply is for some reason switched off, the address determination may need to be performed again when the voltage supply is available the next time.

As a non-limiting example of the address determination logic implemented with electronic circuitry asset of comparators may be used. Each comparator is provided with the analogue address signal and a reference signal. The reference signal for each comparator is unique and substantially corresponds with one value of the analogue address. For example, such values could be 1.215 V, 2.300 V, 3.515 V, etc. The correct address value may be determined by examining the outputs of the comparators. If a comparator outputs a low voltage value (e.g. 0 V) when the analogue address signal is higher than (or equal to) the reference value and a high voltage value (e.g. 5 V) when the analogue address signal is lower than the reference value, the combination of output values of the comparators reveals the level of the address signal. As an example, if there are three comparators and the reference values are 1.215 V, 2.300 V and 3.515 V, respectively, the first comparator may output 0 V and the second and third comparator may output 5 V when the address signal is 1.215 V; the first and the second comparator may output 0 V and third comparator may output 5 V when the address signal is 2.300 V; and all three comparators may output 0 V when the address signal is 3.515 V.

Figure 6A:
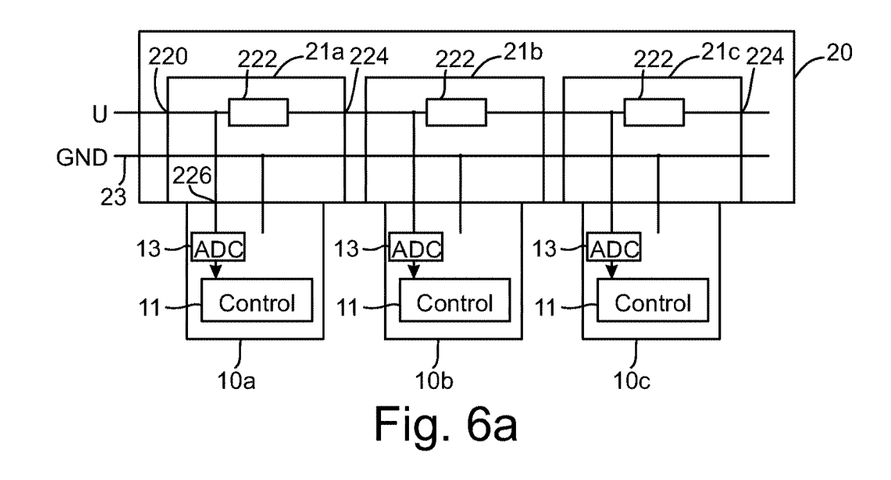
FIG. 6a illustrates an addressing principle, in accordance with an embodiment.

In accordance with another embodiment, the analogue address scheme may be implemented by using some kind of voltage or current divider principle. Each module connection of the backplane 20 may comprise a resistor or another appropriate component applicable for being a part of a voltage divider or a current divider. An example of this is depicted in FIG. 6*a*. An address generating voltage is supplied to an address voltage input 220 of a first connector 21*a* of the backplane 20. One terminal of a voltage dropping element 222, such as a resistor, is coupled to the address voltage input 220 and another terminal of the voltage dropping element 222 is coupled with a residual voltage output 224 of the first connector 21*a*. The first connector 21*a* as well as the other connectors 21*b*, 21*c* of the backplane 20 has an analogue address line 226 to supply the analogue address voltage to the input/output module 10*a*, 10*b*, 10*c* respectively. A ground plane 23 (0 V) is also coupled to the connectors 21*a*, 21*b*, 21*c* and to the input/output modules 10*a*, 10*b*, 10*c*. The voltage output 224 of the last connector 21*c* of the chain of connectors (e.g. all connectors of one backplane or all connectors coupled in series using separate cables) may be coupled to the ground plane or to another voltage level which, however, is different from the voltage at the address voltage input 220 of a first connector 21*a*. Hence, each voltage dropping element produces a certain decrement of voltage (or increment if the another voltage level is higher than the voltage at the address voltage input 220 of a first connector 21) in the chain of voltage dropping elements, wherein at each connector the analogue address voltage is different.

The input/output module 10*a*, 10*b*, 10*c* converts the analogue voltage to a digital value (or values) and uses this digital value (or values) to determine the address of the connector 21*a*, 21*b*, 21*c* to which the input/output module 10*a*, 10*b*, 10*c* is coupled. The determination may be performed, for example, as was described above or by using another appropriate method.

Figure 6B:
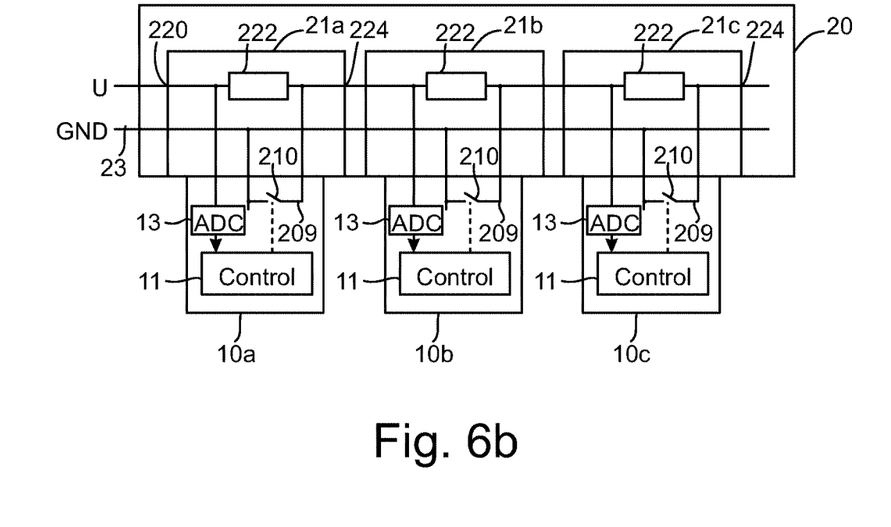
FIG. 6b illustrates a variation of the addressing principle of FIG. 6a, in accordance with an embodiment.

FIG. 6*b* illustrates a variant of the embodiment of FIG. 6*a*. In this variant the input/output modules 10*a*, 10*b*, 10*c* comprise a grounding line 209 which is coupled via the connector 21 with the residual voltage output 224 of the connector 21. The input/output modules 10*a*, 10*b*, 10*c* may control the grounding line 209 e.g. by a switch 210 so that it causes the residual voltage output 224 to be grounded i.e. coupled to the 0 V level. Hence, only those voltage dropping elements which are electrically between the grounded residual voltage output 224 and the address voltage input 220 of the first connector 21*a* take part to the voltage division. In other words, if for example the second input/output module 10*b* grounds the residual voltage output 224 of the second connector 21*b*, the address voltage supplied to the address voltage input 220 of the first connector 21*a* is divided by two voltage dropping elements and the second input/output module 10*b* receives an address voltage which is half of the address voltage supplied to the address voltage input 220 of the first connector 21*a*, when substantially equal voltage dropping elements are used. If, for example, the third input/output module 10*c* grounds the residual voltage output 224 of the third connector 21*c*, the address voltage supplied to the address voltage input 220 of the first connector 21*a* is divided by three voltage dropping elements and the third input/output module 10*b* receives an address voltage which is one third of the address voltage supplied to the address voltage input 220 of the first connector 21*a*, when substantially equal voltage dropping elements are used.

Because only one input/output module 10*b* should ground the residual voltage output 224 of the connector 21 at the same time, the input/output modules 10 may utilize a kind of interrupt procedure to initiate the grounding and a subsequent release of the grounding. It may be improbable that more than one input/output modules 10 will run the interrupt routine at the same time. Moreover, it may be sufficient that the input/output modules 10 read the analogue address voltage only once after they have been switched on. Of course, the address reading procedure may be repeated if the input/output module 10 is later switched off and if there is a possibility that the input/output module 10 has been moved to a different location meanwhile.

The voltage level at the at the address line may be higher than the allowable voltage level of the analogue-to-digital converter of the input/output module 10. This voltage may then be scaled down to the allowable voltage range by e.g. a resistor divider or some other appropriate circuitry.

It should be noted here that the input/output modules 10 have a connector which is a counterpart for the connectors 21 used in the backplane 20 and that signals, voltages, currents traverse via wires of the conductors between the input/output modules 10 and the connectors 20. At least a part of wires of the connectors of the input/output modules 10 are coupled to the internal circuitry of the input/output modules 10.

When the input/output module 10 have determined their current addresses they may begin to receive and/or send messages to the interface bus to communicate with the process station controller. The structure of the messages may be similar to situations in which a traditional, digital addressing scheme is used, because the analogue addressing method does not affect to the message delivery but mainly to the address determination principles.

It should be noted here that the addressing principles described in this specification may also be implemented in other kinds of systems than the process control system mentioned above.

The present invention is not solely limited to the above described embodiments but may be varied within the scope of the appended claims.

The invention claimed is:

1. A backplane for providing address signals to a plurality of modules attachable with the backplane, the backplane comprising:
    at least a first interface connector and a second interface connector;
    the first interface connector is coupled with a first address composer;
    the first address composer configured to produce a first address signal as an analogue address voltage or an analogue address current from an analogue input voltage or current to an address line of said first interface connector, wherein the first address signal being indicative of an address to be used by a first module when attached with the first interface connector of the backplane;
    an address signal output for outputting the address signal generated by the first address composer from the analogue input signal;
    the second interface connector is coupled with a second address composer;
    the second address composer configured to produce a second address signal as an analogue address voltage or an analogue address current from the address signal at the address signal output generated by the first address composer to an address line of said second interface connector, wherein the second address signal being indicative of an address to be used by a second module when attached with the second interface connector of the backplane;
    an address signal input in each of said first interface connector and said second interface connector for receiving an analogue input voltage or current for the address composer; and
    an address signal output in each of said first interface connector and said second interface connector for outputting the address signal generated by the address composer from the analogue input signal,
    wherein the address signal output of said first interface connector is coupled with the address signal input of said second interface connector for receiving the address signal generated by the first address composer.

2. The backplane according to claim 1, wherein the address composer is configured to produce the address signal by changing the level of the analogue input signal.

3. The backplane according to claim 1, wherein the address composer is a low dropout regulator.

4. The backplane according claim 1, wherein the analogue address signal is based on frequency.

* * * * *